UNITED STATES PATENT OFFICE 2,094,146

PROCESS FOR DISPERSING BLACK PIGMENTS

Paul F. Elliott, Parlin, and Robert Tyler Hucks, South River, N. J., assignors to E. I. du Pont de Nemours & Company, Wilmington, Del., a corporation of Delaware No Drawing. Application March 1, 1935, Serial No. 8,852

1 Claim. (Cl. 106—40)

This invention relates to a process for dispersing black pigments and more particularly to a process for dispersing carbon black and similar dusty pigments for use in cellulose derivative compositions.

Black cellulose derivative type enamels have been manufactured by grinding the pigment in a ball mill in a suitable medium or by dispersing the pigment in a heavy cellulose derivative plastic colloid by means of roller mills. Black finishing compositions prepared by ball mill grinding are deficient in gloss and depth of color. Compositions produced by roller mills afford improvement with respect to color and gloss but the method is not entirely satisfactory from an economic and production standpoint. The latter procedure requires constant attention of an operator and also results in losses from volatile materials which are necessary in preparing the compositions.

This invention has as an object the provision of a process for the manufacture of black cellulose derivative compositions, which compositions are characterized by improved gloss and depth of color.

A further object is the provision of a process which results in substantial operating economies.

The objects of this invention are accomplished by adding the black pigment to uncolloided nitrocellulose and kneading, the pigment being treated previous to the kneading operation so as to reduce its volume and insure ready incorporation with the cellulose derivative.

In practicing the present invention, the black pigment is first treated with one of the liquid ingredients of the final composition, preferably the plasticizer. This mixture is then introduced into a kneading machine together with the alcohol wet nitrocellulose and kneading continued until the pigment has been satisfactorily dispersed throughout the medium.

By way of illustration, the following examples and detailed procedure are given. It is to be understood, however, that the scope of the invention is not limited to such examples except as indicated in the appended claim.

Example 1

| | Percent |
|---|---|
| Carbon black | 13.97 |
| Dibutyl phthalate | 18.20 |
| Cellulose nitrate | 47.38 |
| Denatured alcohol | 20.45 |
| | 100.00 |

In this example the carbon black pigment and an equal weight of dibutyl phthalate are first tumbled in a closed container, or otherwise thoroughly admixed until a homogeneous mixture is obtained, usually a period of from three to twelve hours is necessary. This treatment reduces the volume of the pigment to an appreciable extent and at the same time eliminates dusting, thus greatly facilitating handling during subsequent operations.

The so treated pigment is then placed into a kneading machine; for example, a Banbury mixer, a type well known in the art, together with the alcohol wet cellulose nitrate and the balance of dibutyl phthalate. This mixture is kneaded and the kneading continued until the pigment has been thoroughly dispersed throughout the dispersing medium, which requires approximately ten to thirty minutes.

The preparation of the final coating composition is carried out by the addition of the intermediate product, that is, pigment dispersed in cellulose derivative with plasticizer, to the other desired ingredients such as gum solution, solvents, diluents, additional plasticizer or cellulose derivative dispersion, if needed, in an agitator type mixer and the mixing carried out until a uniform product is obtained. If desired, the intermediate product may be placed on roller mills and sheeted, in which condition the final preparation of the coating composition is facilitated.

Example 2

| | Percent |
|---|---|
| Carbon black | 21.7 |
| Dibutyl phthalate | 14.2 |
| Nigrosine | 3.1 |
| Nitrocellulose | 42.8 |
| Denatured alcohol | 18.2 |
| | 100.0 |

In this example a small amount of nigrosine is added to intensify the color of the final finish. This ingredient may be added to the alcohol wet cellulose nitrate at the time the treated pigment is added, just prior to the start of kneading operations. It is to be noted from the formula that successful results may be secured by pretreating the pigment with substantially smaller quantities of treating agent.

The optimum amount of plasticizer used in the so-called pre-treatment of the black pigment has been found to be between one and two parts of plasticizer to two parts of pigment. The use of such ratios of plasticizer to pigment reduces the volume of the pigment, commonly carbon black, to a satisfactory degree. Smaller amounts of plasticizer may be used if desired although the general operating conditions will not be as satisfactory. amounts of plasticizer equal to the total required in the final coating composition may be used but it has been found that when the proportion of pigment to plasticizer is substantially greater than 1 to 1 the ease of handling the composition is considerably reduced.

The black pigment treated according to the procedure described above is not substantially altered in its general physical appearance but has lost its undesirable dusting property which is highly desirable in the use of this type of pigment.

While dibutyl phthalate has been mentioned as the plasticizer in the examples above, other commonly used plasticizers such as diethyl phthalate, tricresyl phosphate, dimethyl cellosolve phthalate (ethylene glycol dimethyl ether phthalate) may be substituted. It is, however, desirable that the plasticizer be of the so-called solvent type or latent solvent type, that is, of such a character as to be activated by the alcohol present in the cellulose derivative, in order that the cellulose derivative may be simultaneously colloided with the dispersion of the treated pigment throughout the vehicle.

Other liquid ingredients which are tolerated in the final enamel, such as amyl alcohol, ethyl acetate, butyl acetate, higher alcohols and their liquid esters, etc., may be used for pre-treating the pigment although, when amyl alcohol or the like is used, it is necessary to add sufficient colloiding agent, such as dibutyl phthalate, at the start of the kneading cycle to colloid the nitrocellulose. It is, of course, permissible, if desired, to combine two or more of the liquid ingredients in suitable proportions for the pre-treatment of the pigment.

The invention is not limited to the use of any particular type of cellulose nitrate since, for example, in the case of cellulose nitrate fibrous type, pre-colloided type as smokeless powder, nitrated regenerated cellulose, nitrated dense cellulose, nitrated wood pulp, etc., may be used with equally satisfactory results.

The process is also applicable for use in connection with dispersing black pigments in other cellulose derivative such as cellulose acetate and other esters and also the cellulose ethers as ethyl, benzyl, etc., cellulose. The use of cellulose derivatives other than the nitrate will, of course, require the choice of different plasticizers, which choice however will be readily evident to those skilled in the art.

The process is particularly applicable to the dispersing of high grade carbon black pigments which usually give considerable trouble because of their dusting tendencies and large volume per unit of weight. Other types of black pigments which have inherently similar undesirable properties but to a less degree, such as the low grade carbon blacks which are characterized by lower oil absorption are not, however, excluded from the scope of the invention since the process disclosed may be advantageously used with such pigments. While the invention is primarily directed to the dispersion of carbon black, it is also applicable to pigments having substantially the same properties regardless of color.

The process of this invention is of particular utility in the manufacture of cellulose derivative coating compositions and is also of value in connection with the preparation of cellulose derivative plastics where similar improvements in manufacturing technique are desirable or necessary. Because of the decided advantages resulting from the use of the process, particular applications will readily occur to those skilled in the art.

This invention presents as a principal advantage general operating economies in the dispersion of black pigments for use in the preparation of cellulose derivative compositions.

Another advantage is the ease of handling black pigments of the carbon black type with respect to volume of pigment to be handled and the elimination of contamination of other operations by the carbon black.

A still further advantage is the reduction in solvent evaporation losses which are now generally encountered in the present type of pigment dispersion methods.

A still further advantage is the production of finished coating compositions which are characterized in the resulting film by high gloss and excellent depth of color.

We claim:

Process of dispersing carbon black pigments which comprises mixing at ordinary temperatures one part of said pigment with from one-half to one part of a solvent plasticizer for a cellulose derivative, whereby the dustiness of the carbon black is reduced but its physical appearance is not otherwise appreciably altered, and thereafter kneading the said pigment with a cellulose derivative wet with alcohol and a colloiding agent to colloid the cellulose derivative.

PAUL F. ELLIOTT.
ROBERT TYLER HUCKS.